United States Patent [19]
Kobayashi

[11] Patent Number: 6,148,370
[45] Date of Patent: Nov. 14, 2000

[54] SEMICONDUCTOR MEMORY DEVICE INCLUDING CACHE MEMORY USED AS A RAM

[75] Inventor: Tsuguo Kobayashi, Tokyo, Japan

[73] Assignee: Kabushiki Kaisha Toshiba, Kawasaki, Japan

[21] Appl. No.: 08/867,393

[22] Filed: Jun. 2, 1997

[30] Foreign Application Priority Data

Jun. 5, 1996 [JP] Japan .................................. 8-142954

[51] Int. Cl.⁷ .................................................. G06F 12/00
[52] U.S. Cl. ........................... 711/118; 711/104; 711/136; 711/144
[58] Field of Search ............................... 711/3, 105, 118, 711/130, 136, 144, 145, 154, 160

[56] References Cited

U.S. PATENT DOCUMENTS

| | | | |
|---|---|---|---|
| 4,442,488 | 4/1984 | Hall | 711/118 |
| 4,460,959 | 7/1984 | Lemay et al. | 711/118 |
| 5,067,078 | 11/1991 | Talgam et al. | 711/3 |
| 5,140,690 | 8/1992 | Hata et al. | 711/136 |
| 5,253,351 | 10/1993 | Yamamoto et al. | 711/136 |
| 5,353,425 | 10/1994 | Malamy et al. | 711/136 |
| 5,404,483 | 4/1995 | Stamm et al. | 711/144 |
| 5,410,669 | 4/1995 | Biggs et al. | 711/118 |
| 5,551,002 | 8/1996 | Rosich et al. | 711/160 |

FOREIGN PATENT DOCUMENTS 5-334189 12/1993 Japan .

Primary Examiner—Tuan V. Thai
Attorney, Agent, or Firm—Foley & Lardner

[57] ABSTRACT

In a control register, tag address information which points at RAM areas defined in a data array is stored. A comparator compares a tag address of a cache access address with the tag address information stored in the control register and generates an access control signal which indicates that the RAM area defined in the data array of the cache memory is accessed according to the cache access address and which controls access to data in the RAM areas. As a result, RAM areas can be defined in arbitrary areas of the cache memory with treating the entry as a unit.

1 Claim, 9 Drawing Sheets

SEMICONDUCTOR MEMORY DEVICE INCLUDING CACHE MEMORY USED AS A RAM

BACKGROUND OF THE INVENTION

1. Field of the Invention

The present invention relates to a semiconductor memory device using arbitrary data areas of a cache memory as data storage areas of a RAM(random access memory).

2. Prior Art

In recent years, microprocessors have raised operation clock frequencies and enlarged memory bandwidths. Therefore, the amount of data processed by microprocessors has become enormous. In particular, it has become necessary to access data of a substantial size rapidly as in image data.

In the case where both a cache memory allowing high-speed access to data and a RAM were required, hardware was conventionally constructed by preparing a cache memory 100 and a RAM 101 separately as shown in FIG. 1, for example. In such a case, the entire hardware increased. Especially in the case where the memories were mounted on a chip so as to be mixed with a microprocessor, the chip area of the microprocessor and the cost increased.

In order to avoid such an inconvenience, a part of the cache memory was used as the RAM in some semiconductor memory devices. In this cache memory, a status bit is set to a lock state when data are written into an entry used as the RAM. Data of the entry used as the RAM are thus prevented from being rewritten at the time of a cache miss. When such a technique was used, however, data rewriting control in a refill operation at the time of a cache miss became complicated and it was difficult to use large areas of the cache memory as the RAM.

Another example of a memory in which a part of the cache memory is used as the RAM is shown in FIG. 2. In FIG. 2, a control circuit 103 for controlling the input/output operation of stored data is provided for a single way or a plurality of ways of a data array 102, in a cache memory having a plurality of ways of set associative method so that the data array 102 of the cache memory is used as the RAM with treating the way as a unit.

Furthermore, according to an invention described in U.S. Pat. No. 5,410,669 (Apr. 25, 1995), some ways included in a plurality of ways of a cache memory can be used as a static RAM with treating the way as a unit.

In such a cache memory, the way is a unit when the data array of the cache memory is used as the RAM so that the capacity of the RAM is designed only by the way. Therefore, it is impossible to design the capacity of the RAM finely according to each system.

As heretofore described, the conventional techniques for constructing a memory having both a cache memory and a RAM had disadvantages of a large-sized configuration, complicated refill operation, and a RAM capacity which can not be arbitrarily designed.

SUMMARY OF THE INVENTION

In view of the facts heretofore described, the present invention has been made. An object of the present invention is to provide a semiconductor memory device having both a cache memory and a RAM, which is not large-sized in configuration, which is not complicated in control at the time of the refill operation, and which makes it possible to arbitrarily design the capacity of the RAM.

In order to achieve the above described object, there is provided a semiconductor memory device comprising: a cache memory, the cache memory comprising a decoder for decoding an index address to access the cache memory, a tag array for storing a tag address to be selected on the basis of output of the decoder, a status bit area for storing a status bit indicating a state of data to be stored, an LRU for controlling data replacement at the time of a cache miss, a data array for storing data in association with a tag address stored in the tag array, a RAM area serving as a data storage area of a RAM being defined in arbitrary areas of the data array with treating a entry as a unit, and a comparator for comparing the tag address stored in the tag array with a tag address of a cache access address supplied from outside, thereby discriminating a cache hit/miss, and outputting a cache hit signal; RAM area pointing means for storing tag address information, the tag address information pointing at the RAM areas defined in the data array; and a comparator for comparing the tag address of the cache access address with the tag address information stored in the RAM area pointing means and generating an access control signal which indicates that the RAM area defined in the data array of the cache memory is accessed according to the cache access address and controls access to data in the RAM areas.

Furthermore, there is provided a semiconductor memory device according to the above invention, wherein the status bit area comprises at least one RAM use bit in which, when the RAM area is defined in the data array, a RAM use state is set according to an entry of the defined RAM area, the RAM use bit being referred to at time of a hit check.

Furthermore, there is provided a semiconductor memory device according to the above invention, further comprising setting means at initializing for setting the tag address information in the RAM area pointing means when a system including the cache memory is started.

Furthermore, there is provided a semiconductor memory device according to the above invention, further comprising setting means at loading for setting the tag address information in the RAM area pointing means when each of programs to be executed in a system including the cache memory is loaded.

Furthermore, there is provided a semiconductor memory device according to the above invention, further comprising setting means at initializing/loading for setting the tag address information in the RAM area pointing means when a system including the cache memory is started and when each of programs to be executed in a system including the cache memory is loaded.

The nature, principle and utility of the invention will become more apparent from the following detailed description when read in conjunction with the accompanying drawings.

DESCRIPTION OF THE PREFERRED EMBODIMENTS

Hereafter, preferred embodiments of the present invention will be described.

Figure 1:
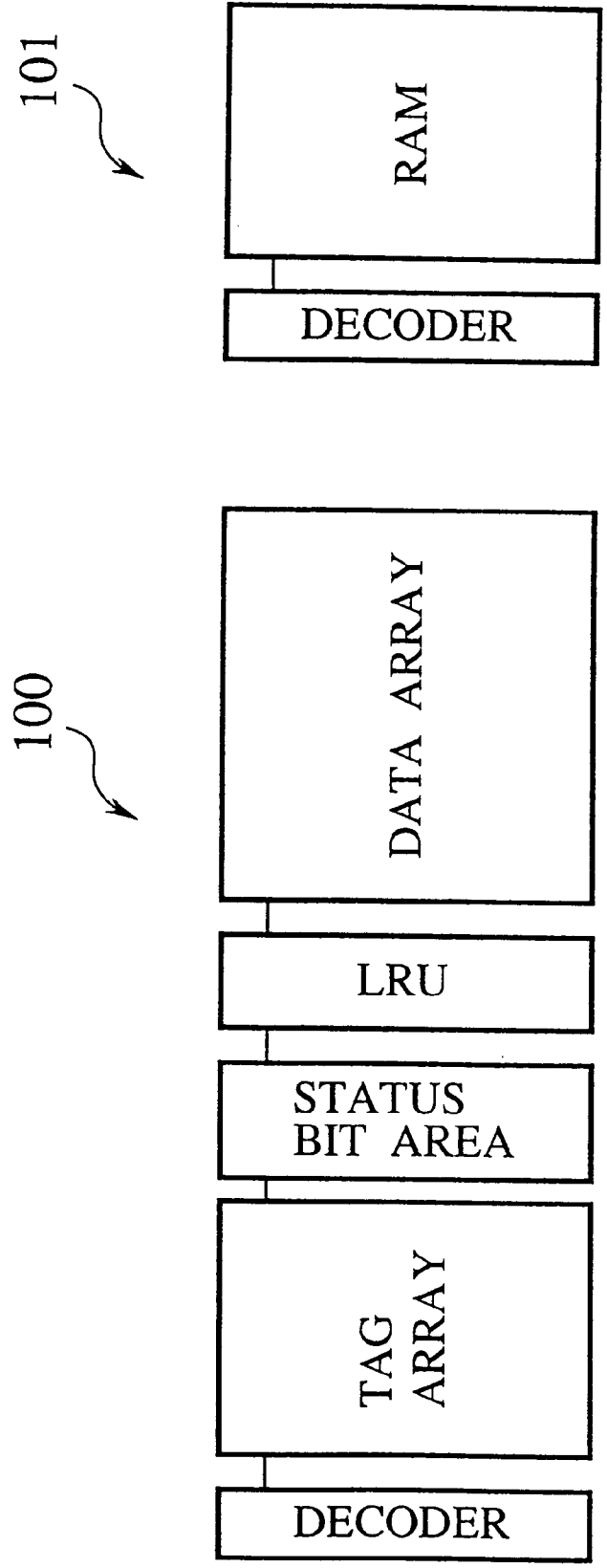
FIG. 1 is a diagram showing the configuration of a conventional memory having a cache memory and a RAM.
Figure 2:
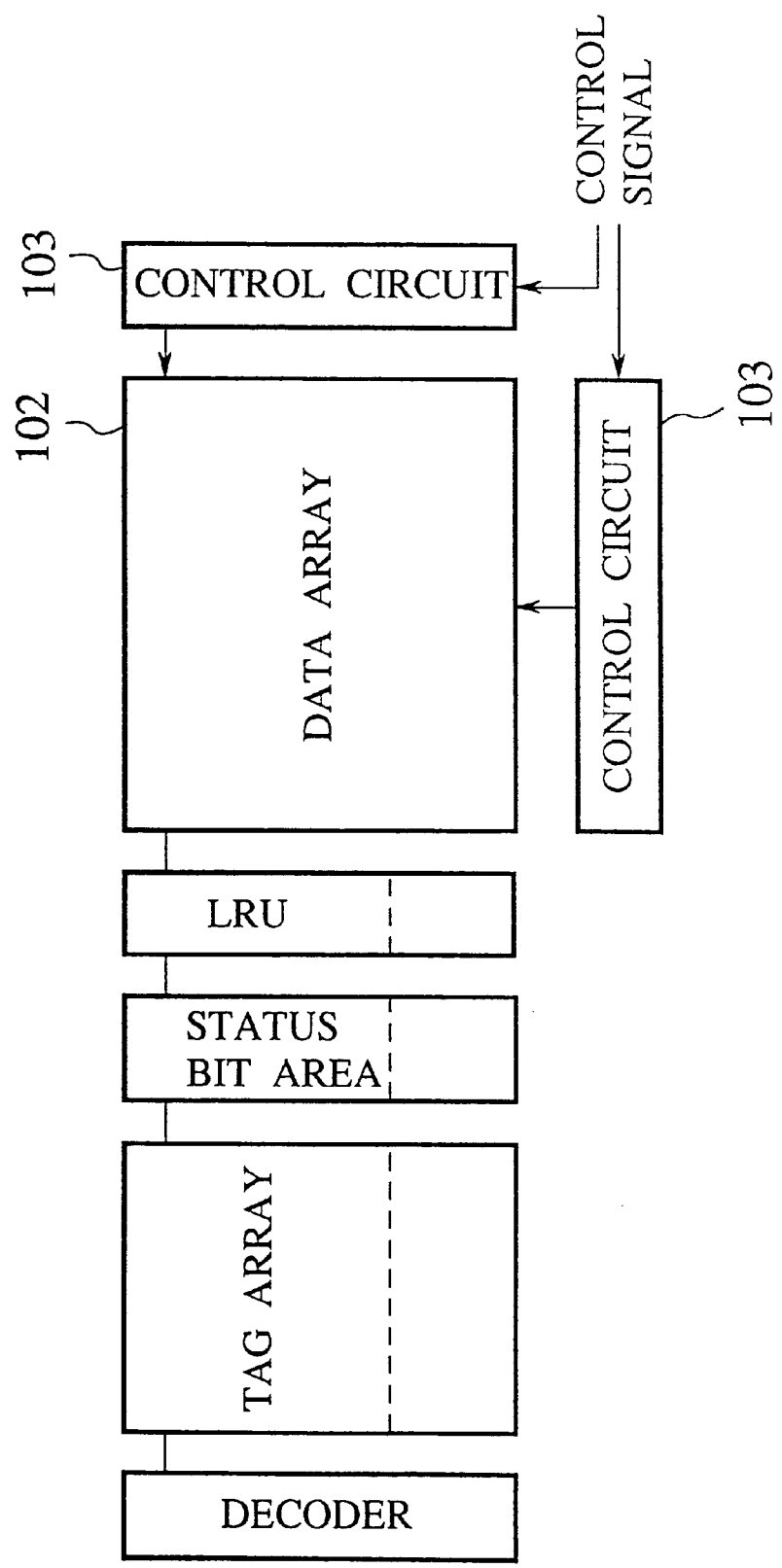
FIG. 2 is a diagram showing the configuration of a conventional memory having RAM areas in a cache memory.
Figure 3:
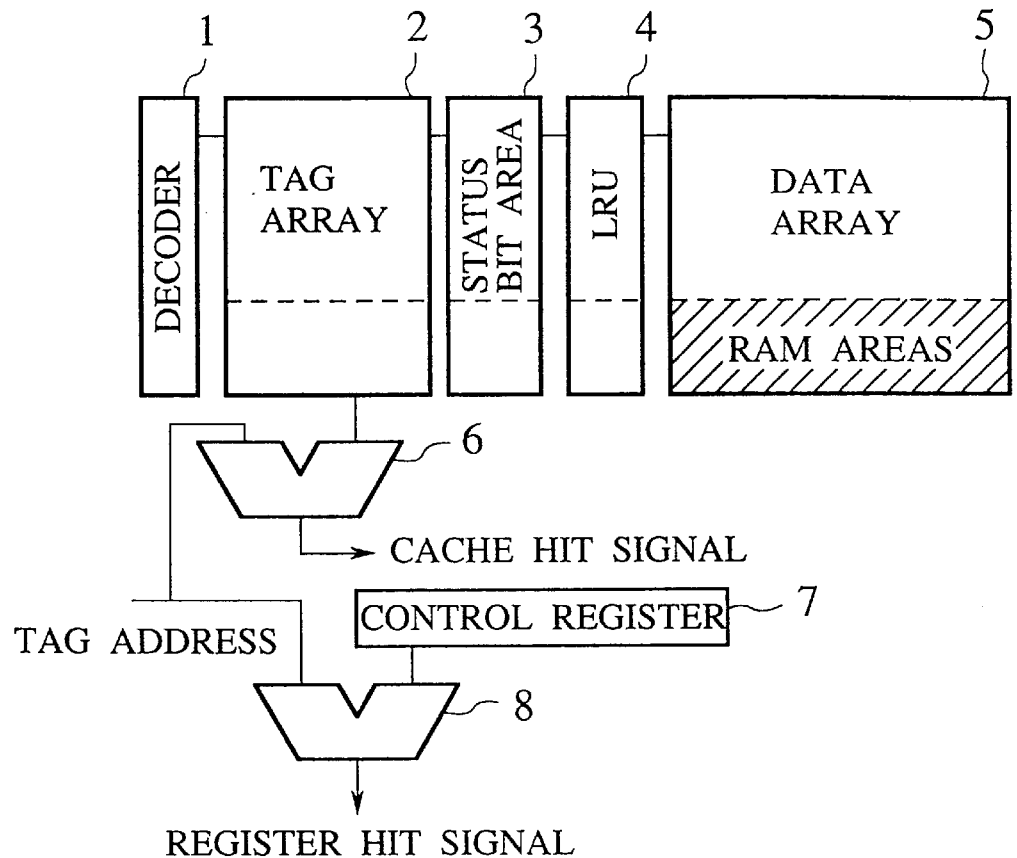
FIG. 3 is a diagram showing the configuration of a first embodiment of a semiconductor memory device according to the present invention.

FIG. 3 is a diagram showing the configuration of a first embodiment of a semiconductor memory device according to the present invention.

In the semiconductor memory device of this embodiment, arbitrary areas of a cache memory designed by means of a direct mapping method is used as a RAM as shown in FIG. 3. The semiconductor memory device of this embodiment includes a cache memory. The cache memory includes a decoder 1 for decoding an index address of a cache access address, a tag array 2 for storing a tag address to be selected on the basis of decoding in the decoder 1, a status bit area 3 for storing a status bit indicating the state of data to be stored, an LRU (Least Recent Used) 4 for controlling data replacement at the time of a cache miss, and a data array 5 for storing data in association with a tag address stored in the tag array 2. In arbitrary areas of the data array 5, RAM areas are designed as data storage areas of a RAM (Random Access Memory) with treating the entry as a unit. The cache memory further includes a comparator 6. The comparator 6 compares a tag address stored in the tag array 2 with a tag address of a cache access address supplied from the outside, discriminates a cache hit/miss, and outputs a cache hit signal. The semiconductor memory device of this embodiment further includes a control register 7, as a RAM area pointing means, for storing tag address information which points at the RAM areas defined in the data array 5 of the cache memory. The semiconductor memory device of this embodiment further includes a comparator 8. The comparator 8 compares a tag address served as a cache access address with the tag address information stored in the control register 7, and generates a register hit signal which indicates that the RAM areas defined in the data array 5 of the cache memory have been accessed according to the cache access address and which serves as an access control signal for controlling the access to data in the RAM areas.

Figure 4:
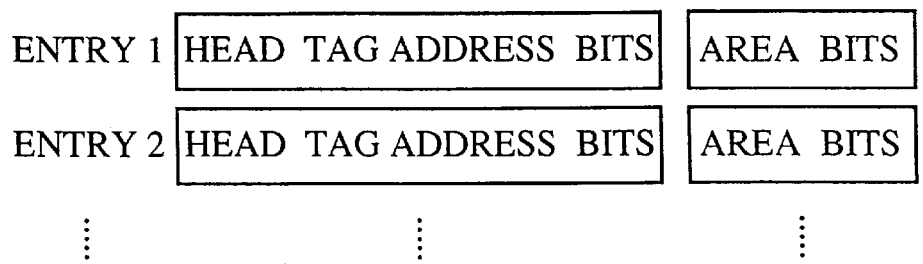
FIG. 4 is a diagram showing the configuration of a control register illustrated in FIG. 3.

In a single arbitrary area or a plurality of different arbitrary areas of the data array 5, an arbitrary number of entries are defined as a RAM area or RAM areas according to the RAM capacity to be defined. Thus, at this time, the entry is a unit. The addresses of the RAM areas thus defined are written in the control register 7. The control register 7 is configured as shown in FIG. 4, and has entries depending on the number of the RAM areas defined in the data array 5. In each entry, a head tag address of a RAM area and area bits indicating a size from the head tag address are stored. In other words, the location of a RAM area defined in the data array 5 is identified by the head tag address and the size from the head tag address. Alternatively, a RAM area may be located by a head tag address and an end tag address of the RAM area.

A tag address served as a cache access address supplied from the outside is compared in the comparator 8 with the tag address information relating to the RAM areas defined in the control register 7. It is thus determined whether the RAM areas defined in the data array 5 should be accessed by the tag address supplied from the outside. In the case where the RAM areas defined in the data array 5 has been judged to be accessed by the tag address supplied from the outside, a register hit signal is outputted from the comparator 8. By this register hit signal, data input/output into/from the RAM areas is controlled.

On the other hand, reference to the output of the comparator 8 is conducted at the time of refill operation conducted when a miss has occurred in the cache memory. If the register hit signal is outputted, then the entry of the data array 5 to be subjected to data replacement is in the RAM areas, and consequently data replacement is prevented.

Thus, in this embodiment, an arbitrary number of entries can be defined as RAM areas in arbitrary areas of the cache memory. Therefore, as compared with the conventional techniques whereby the RAM areas are defined with treating the way as a unit, the capacity of the RAM areas can be designed finely according to the system including the cache memory. As a result, the memory having both a cache memory and a RAM can be constructed efficiently and the size of the configuration can be reduced.

Furthermore, access to a RAM area defined in a cache memory can be conducted with a check equivalent to a hit check as to a cache memory, i.e., with a check of the tag address. Therefore, in the same way as the high-speed access to the cache memory, the RAM area can be accessed at high speed.

Furthermore, at the time of a cache miss, a RAM area excluded from an object of data replacement can be discriminated by the tag address comparison alone. Therefore, the refill operation at the time of a cache miss can be controlled easily.

Figure 5:
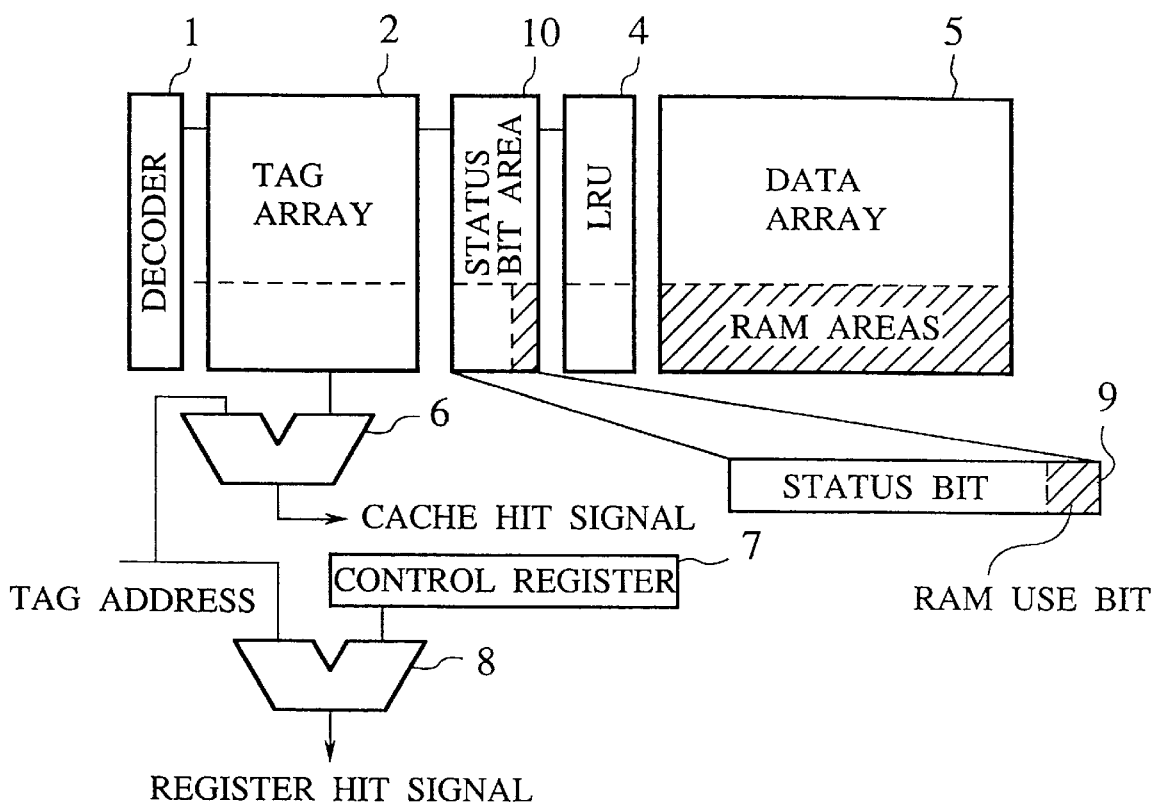
FIG. 5 is a diagram showing the configuration of a second embodiment of a semiconductor memory device according to the present invention.

FIG. 5 is a diagram showing the configuration of a second embodiment of a semiconductor memory device according to the present invention.

In accordance with the embodiment shown in FIG. 5, a RAM use bit 9 is provided in association with an entry of the data array 5 included in the cache memory, and a status bit area 10 is provided instead of the status bit area 3 shown in FIG. 3. If a RAM area is defined in the data array 5, a RAM use bit 9 associated with the entry of the defined RAM area is set to a RAM use state ("1" or "0") in the status bit area 10. The remaining configuration is the same as the configuration shown in FIG. 3.

In such a configuration, effects similar to those of the embodiment shown in FIG. 3 can be obtained. In addition, the RAM use bit 9 is referred simultaneously at the time of a hit check. In addition, the RAM use bit 9 is provided for each tag. Therefore, fine control can be conducted.

Figure 6:
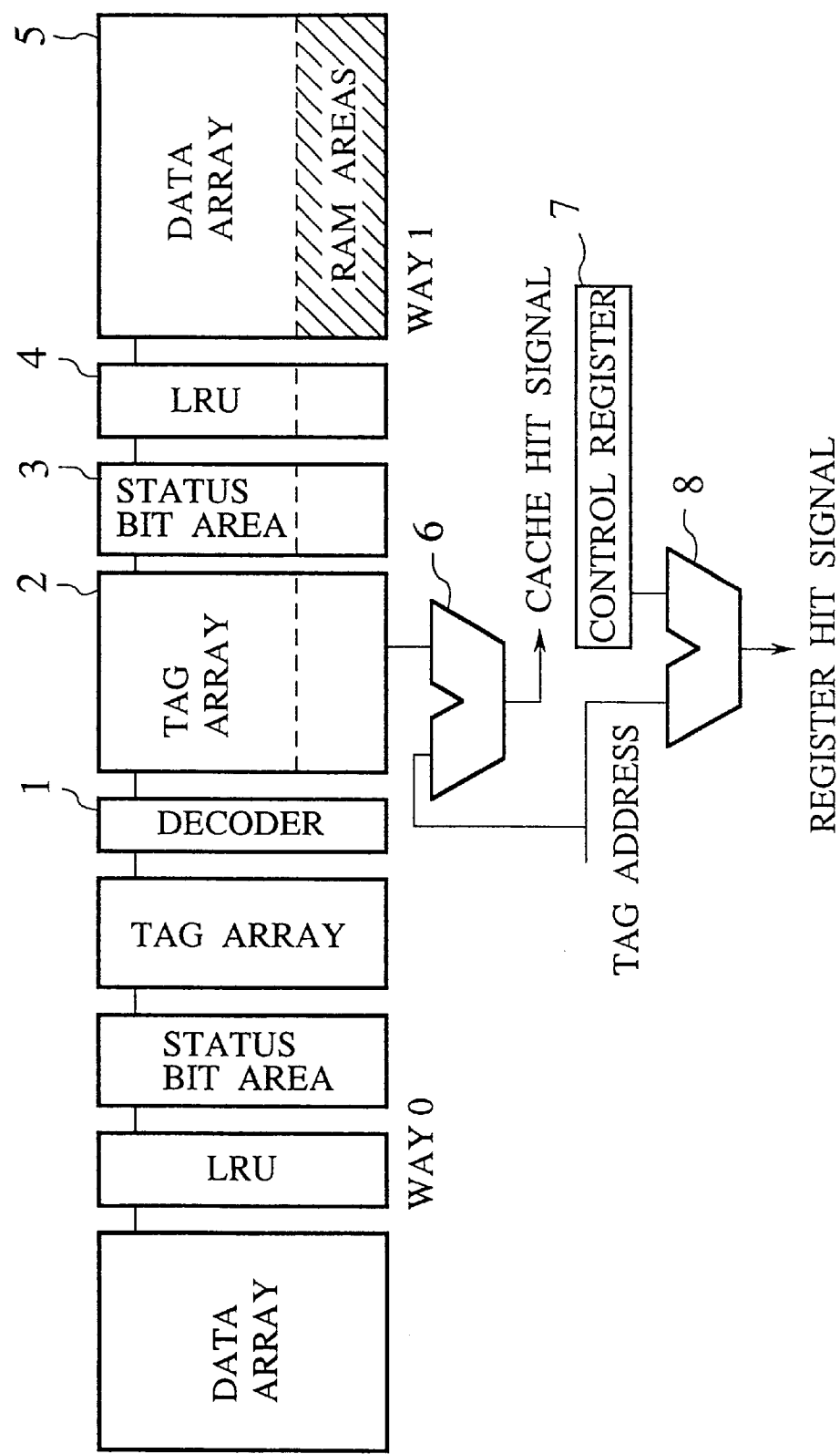
FIG. 6 is a diagram showing the configuration of a third embodiment of a semiconductor memory device according to the present invention.

FIG. 6 is a diagram showing the configuration of a third embodiment of a semiconductor memory device according to the present invention.

In accordance with the embodiment of FIG. 6, the cache memory in the embodiment of FIG. 3 is changed to a cache memory of a two-way set associative method, and a way 1 side has the configuration shown in FIG. 3. In such an embodiment as well, effects similar to those of the embodiment shown in FIG. 3 can be obtained.

Figure 7:
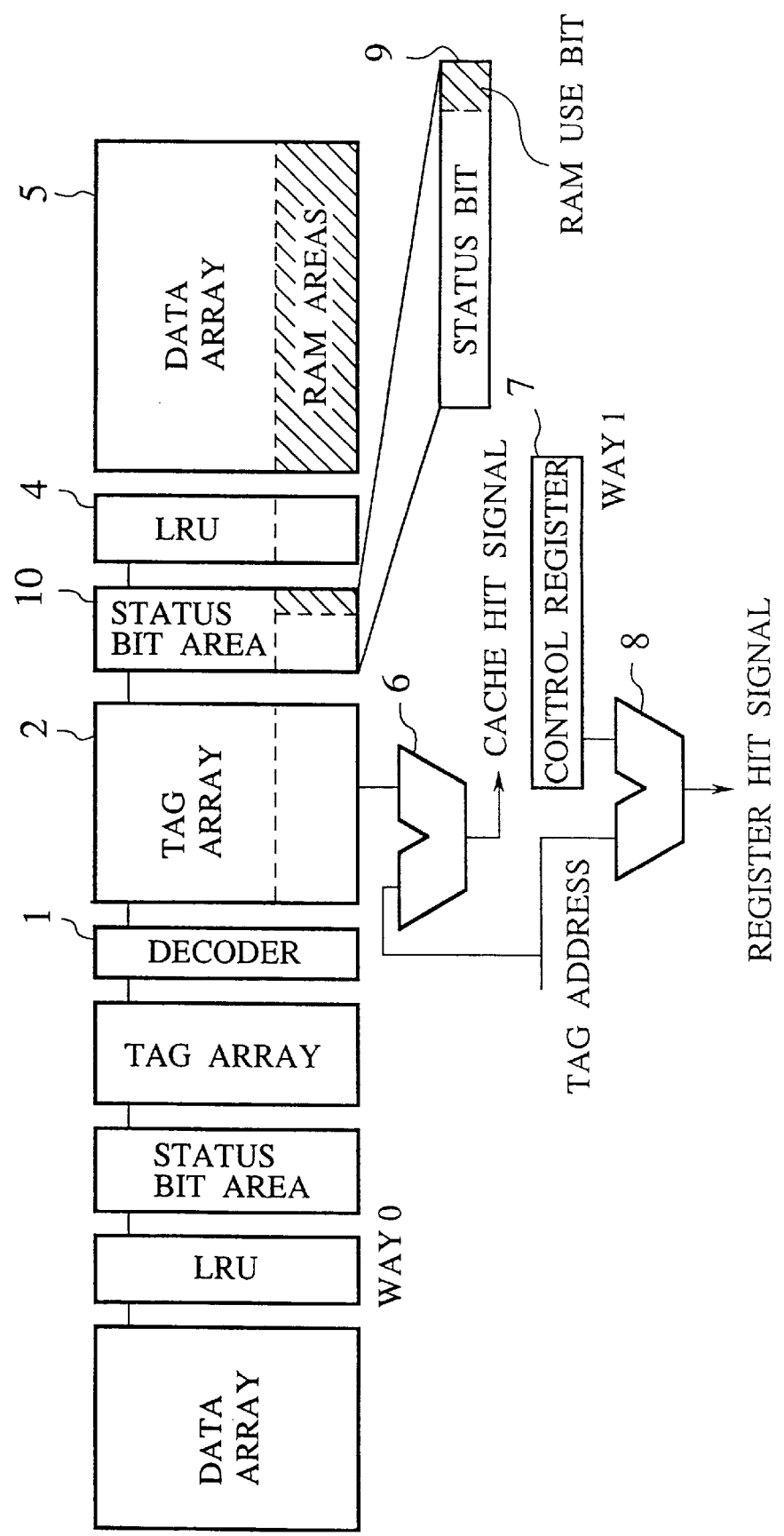
FIG. 7 is a diagram showing the configuration of a fourth embodiment of a semiconductor memory device according to the present invention.

FIG. 7 is a diagram showing the configuration of a fourth embodiment of a semiconductor memory device according to the present invention.

In accordance with the embodiment of FIG. 7, the cache memory in the embodiment of FIG. 5 is changed to a cache memory of a two-way set associative method, and a way 1 side has the configuration shown in FIG. 5. In such an embodiment as well, effects similar to those of the embodiment shown in FIG. 5 can be obtained.

It should be noted that the number of ways in the set associative method is not limited to two in the embodiments shown in FIG. 6 or 7. Even if an arbitrary number of ways, such as four ways, are adopted, the similar effects can be obtained.

Figure 8:
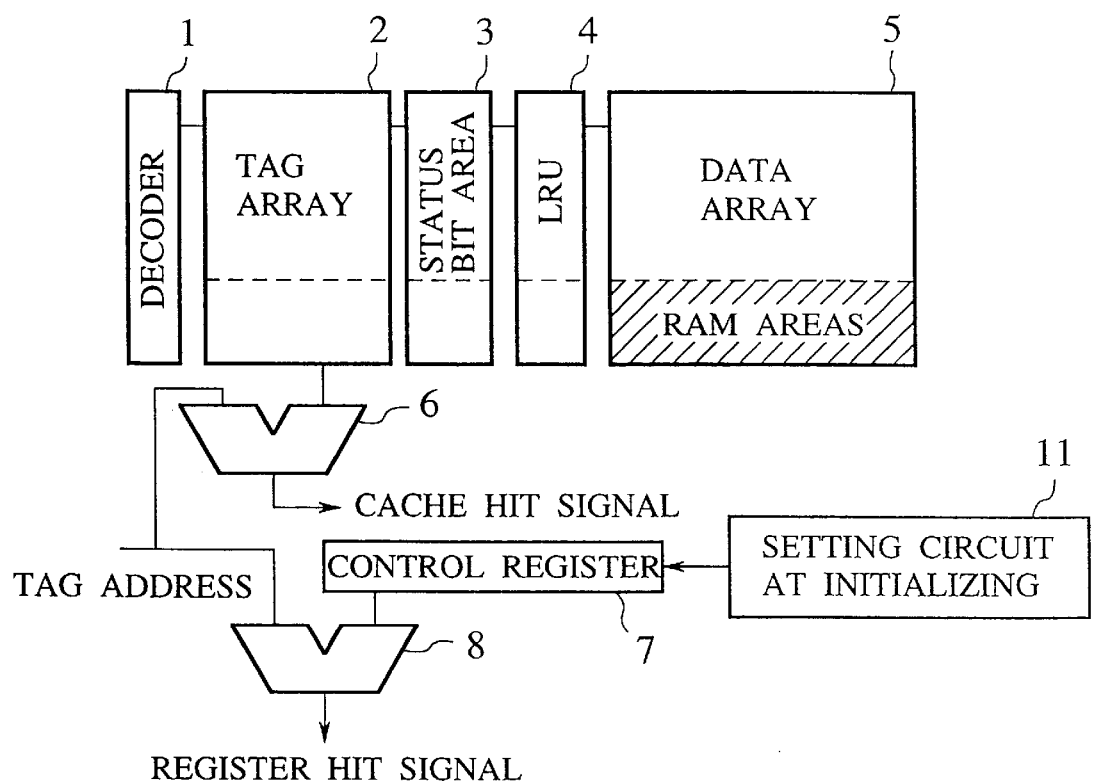
FIG. 8 is a diagram showing the configuration of a fifth embodiment of a semiconductor memory device according to the present invention.

FIG. 8 is a diagram showing the configuration of a fifth embodiment of a semiconductor memory device according to the present invention.

In accordance with the embodiment of FIG. 8, a setting circuit at initializing 11 is provided in the embodiment shown in FIG. 3. When the system including the cache memory is started, the setting circuit at initializing 11 sets tag address information in the control register 7. The remaining configuration is the same as the configuration shown in FIG. 3.

In such an embodiment, at the time of system initialization, the areas of the data array 5 to be used as the RAM can be secured beforehand, since any effective data have not been written into the cache memory at the time of system start.

Figure 9:
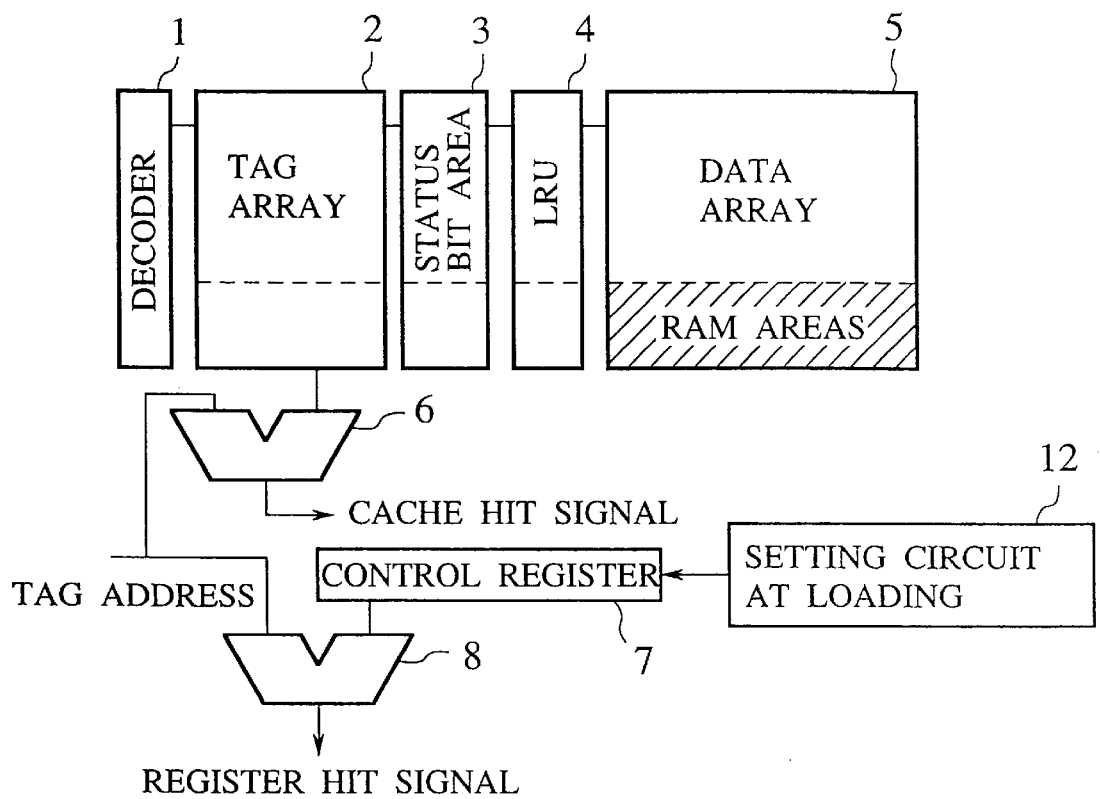
FIG. 9 is a diagram showing the configuration of a sixth embodiment of a semiconductor memory device according to the present invention.

FIG. 9 is a diagram showing the configuration of a sixth embodiment of a semiconductor memory device according to the present invention.

In accordance with the embodiment of FIG. 9, a setting circuit at loading 12 is provided in the embodiment shown in FIG. 3. When each of programs executed in the system including the cache memory is loaded, the setting circuit at loading 12 sets tag address information in the control register 7. The remaining configuration is the same as the configuration shown in FIG. 3.

When each program is loaded, effective data have already been written into the data array 5 of the cache memory. If the data are stored in only the cache memory, it is necessary to write data stored in the areas used as the RAM back into the main memory. In such an embodiment, however, the RAM areas can be freely set and altered from program to program by appropriately selecting free areas or areas where data stored in both the cache memory and the main memory are stored of the data array 5 of the cache memory. Thus, each of areas of the memory having both the cache memory and the RAM areas can be flexibly configured from program to program.

Figure 10:
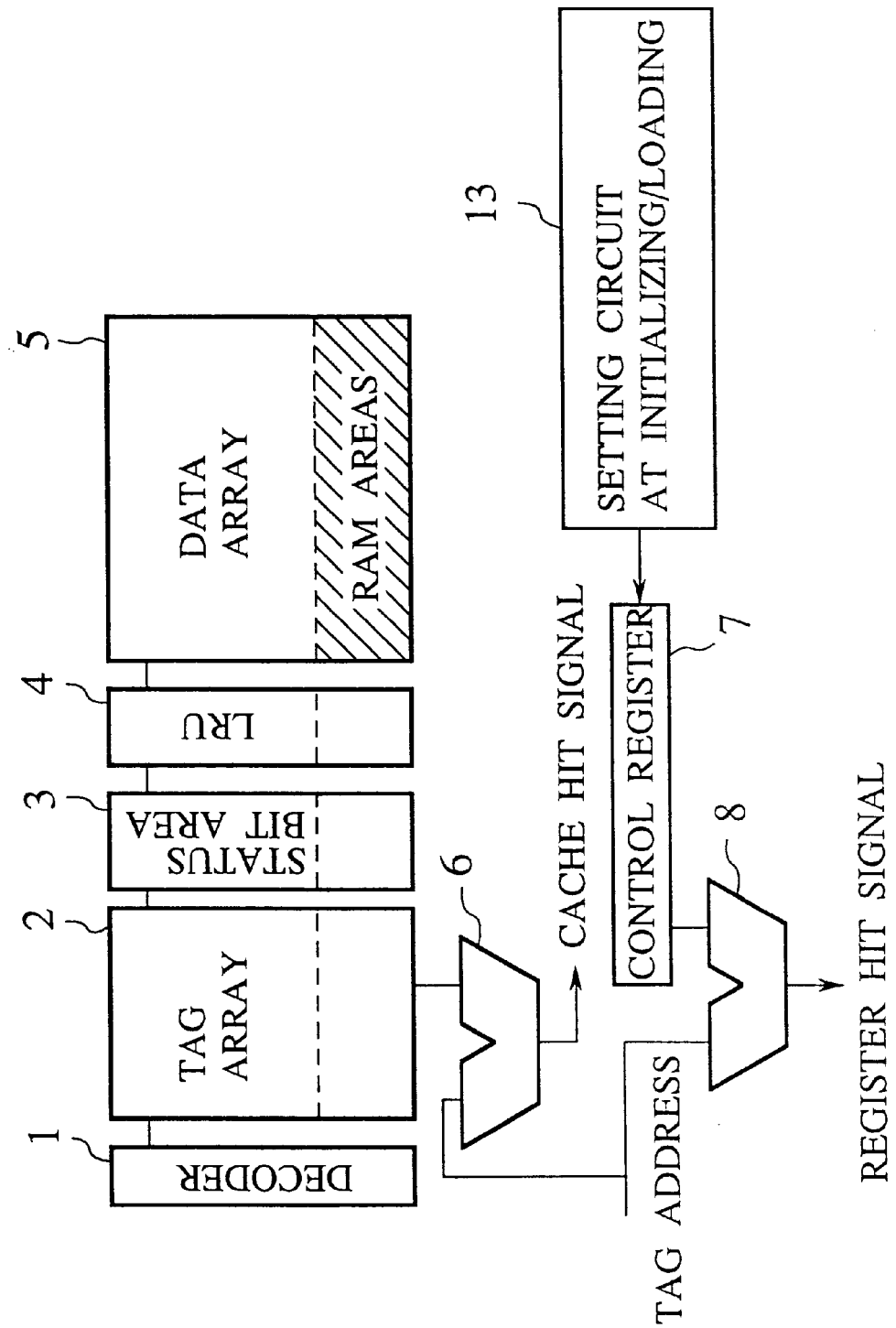
FIG. 10 is a diagram showing the configuration of a seventh embodiment of a semiconductor memory device according to the present invention.

FIG. 10 is a diagram showing the configuration of a seventh embodiment of a semiconductor memory device according to the present invention.

In accordance with the embodiment of FIG. 10, a setting circuit at initializing/loading 13 is provided in the embodiment shown in FIG. 3. When the system including the cache memory is started, and when each of programs executed in the system including the cache memory is loaded, the setting circuit at initializing/loading 13 sets tag address information in the control register 7. The remaining configuration is the same as the configuration shown in FIG. 3.

In such a configuration, effects obtained in the embodiments FIGS. 8 and 9 can be obtained.

Alternatively, the feature of the embodiment shown in FIGS. 5, 6 or 7 maybe applied to the embodiments shown in FIGS. 8, 9 and 10.

As heretofore described, in the first and third embodiments of the present invention, RAM areas of an arbitrary number of entries are defined in arbitrary areas of the cache memory. Therefore, as compared with the conventional techniques whereby the RAM areas are defined with treating the way as a unit, the RAM capacity can be defined finely according to the system including the cache memory. As a result, the memory having both a cache memory and a RAM can be constructed efficiently and the size of the configuration can be reduced.

Furthermore, access to the RAM areas can be conducted with a check of the tag address. In the same way as the high-speed access to the cache memory, therefore, the RAM can be accessed at high speed.

Furthermore, at the time of a cache miss, RAM areas excluded from an object of the data replacement can be discriminated by the tag address comparison alone. Therefore, the refill operation at the time of a cache miss can be controlled easily.

Furthermore, in the second and fourth embodiments of the present invention, a RAM use bit representing that a RAM area has been defined in the data array is provided and the RAM use bit is referred simultaneously at the time of a hit check. Since the RAM use bit 9 is provided for each tag, fine control can be conducted.

Furthermore, in the fifth embodiment of the present invention, there is adopted such a configuration that tag address information of the RAM areas is set when the system is started. At the time of system initialization, therefore, the areas of the data array to be used as the RAM can be secured beforehand.

Furthermore, in the sixth embodiment of the present invention, there is adopted such a configuration that tag address information of the RAM areas is set when a program is loaded. Therefore, the RAM areas can be freely defined and altered from program to program, and each of areas of the memory having both the cache and the RAM areas can be flexibly configured from program to program.

Furthermore, in the seventh embodiment of the present invention, there is adopted such a configuration that tag address information of the RAM areas is set when the system is started, and when a program is loaded. Therefore, both the effect obtained in the fifth embodiment and the effect obtained in the sixth embodiment can be obtained.

It should be understood that many modifications and adaptations of the invention will become apparent to those skilled in the art and it is intended to encompass such obvious modifications and changes in the scope of the claims appended hereto.

What is claimed is:

1. A semiconductor memory device comprising:
   a cache memory, said cache memory comprising a decoder for decoding an index address to access the cache memory, a tag array for storing a tag address to be selected on the basis of output of the decoder, a status bit area for storing a status bit indicating a state of data to be stored, an LRU for controlling data replacement at the time of a cache miss, a data array for storing data in association with a tag address stored in said tag array, a RAM area serving as a data storage area of a RAM being defined in arbitrary areas of said data array with treating an entry as a unit, and a first comparator for comparing the tag address stored in said tag array with a tag address of a cache access address supplied from outside, thereby discriminating a cache hit/miss, and outputting a cache hit signal;

RAM area pointing means for storing tag address information, said tag address information pointing at the RAM area defined in said data array;

a second comparator for comparing the tag address of the cache access address with the tag address information stored in said RAM area pointing means and generating an access control signal which indicates that said RAM area defined in the data array of said cache memory is accessed according to the cache access address and controls access to data in said RAM area; and setting means at initializing/loading for setting said tag address information in said RAM area pointing means when a system including said cache memory is started and when each of programs to be executed in a system including said cache memory is loaded, wherein said status bit area comprises at least one RAM use bit in which, when said RAM area is defined in said data array, a RAM use state is set according to an entry of said defined RAM area, the RAM use bit being referred to at time of a hit check.

* * * * *